(12) United States Patent
Tomekawa et al.

(10) Patent No.: US 8,017,210 B2
(45) Date of Patent: Sep. 13, 2011

(54) MULTILAYER INFORMATION RECORDING MEDIUM AND METHOD FOR MANUFACTURING THE SAME

(75) Inventors: Yuuko Tomekawa, Osaka (JP); Morio Tomiyama, Nara (JP)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 12/373,359

(22) PCT Filed: Oct. 5, 2007

(86) PCT No.: PCT/JP2007/069548
§ 371 (c)(1),
(2), (4) Date: Mar. 24, 2009

(87) PCT Pub. No.: WO2008/059676
PCT Pub. Date: May 22, 2008

(65) Prior Publication Data
US 2009/0280286 A1 Nov. 12, 2009

(30) Foreign Application Priority Data

Nov. 14, 2006 (JP) ................ P 2006-307426
Apr. 19, 2007 (JP) ................ P 2007-110224

(51) Int. Cl.
*B32B 3/02* (2006.01)
(52) U.S. Cl. ........... 428/64.1; 428/64.4; 430/270.11
(58) Field of Classification Search ........... None
See application file for complete search history.

(56) References Cited

U.S. PATENT DOCUMENTS

| | | | | |
|---|---|---|---|---|
| 5,989,669 | A | * | 11/1999 | Usami .................. 428/64.1 |
| 6,576,319 | B2 | | 6/2003 | Yoshinari et al. |
| 6,953,616 | B2 | * | 10/2005 | Mizushima et al. ....... 428/64.1 |
| 2005/0013236 | A1 | | 1/2005 | Hirokane et al. |
| 2005/0175771 | A1 | | 8/2005 | Hisada |
| 2006/0092821 | A1 | | 5/2006 | Tsukagoshi et al. |

FOREIGN PATENT DOCUMENTS

| | | |
|---|---|---|
| JP | 2002-63736 | 2/2002 |
| JP | 2005-141804 | 6/2005 |
| JP | 2005-149657 | 6/2005 |
| JP | 2005-259331 | 9/2005 |
| JP | 2005-267670 | 9/2005 |
| JP | 2006-127636 | 5/2006 |
| WO | 2007/135907 | 11/2007 |

OTHER PUBLICATIONS

International Search Report issued Jan. 15, 2008 in the International (PCT) Application of which the present application is the U.S. National Stage.

* cited by examiner

*Primary Examiner* — Elizabeth Mulvaney
(74) *Attorney, Agent, or Firm* — Wenderoth, Lind & Ponack, L.L.P.

(57) ABSTRACT

A multi-layer information recording medium comprising a substrate that has an inner circumference and an outer circumference, three or more information recording layers and resin layers disposed between the information recording layers, wherein positions of the ends on the inner circumference side of the resin layers are different from each other in at least one combination of two neighboring resin layers, and the end on the inner circumference side of at least one of the resin layers is covered by another resin layer.

14 Claims, 10 Drawing Sheets

(A)

(B)

Region A

Region B

Region C

MULTILAYER INFORMATION RECORDING MEDIUM AND METHOD FOR MANUFACTURING THE SAME

TECHNICAL FIELD

The present invention relates to an information recording medium used in reproduction or recording/reproduction of information and a method for manufacturing the same.

BACKGROUND ART

As increasing amount of information is required by information apparatuses, audio-visual apparatuses, and the like in recent years, information recording media such as optical disks have attracted attention for the advantages thereof such as the ease of access to data, large data storage capacity and possibility of reducing the size of apparatuses, and the recording density thereof has become increasingly higher. As the means for increasing the recording density of an optical disk, for example, such a recording and reproduction head has been put into use that uses laser beam having wavelength of about 400 nm and a condenser lens having numerical aperture (NA) of 0.85 for focusing the laser beam. Use of such a recording and reproduction head enables it to achieve a storage capacity of about 25 GB with a single-layer information recording medium (a medium having one recording layer). A storage capacity of about 50 GB can be achieved with an optical recording medium having two recording layers. For the purpose of increasing the storage capacity even further, multi-layer information recording media having three or more recording layers have been proposed.

FIG. 2 is a sectional view showing a part of a multi-layer information recording medium of the prior art. This drawing shows a section along a diameter of the disk-shaped recording medium, where the left-hand end of a substrate 301 corresponds to inner circumference and the right-hand end of a substrate 301 corresponds to outer circumference. The multi-layer information recording medium is constituted from a first substrate 201 (this substrate may also be referred to as signal substrate) having pits and/or guide grooves formed in configuration of recesses and bumps by transferring process on one side thereof, a first thin film layer 202 disposed on the surface of the first substrate 201 whereon the signals are formed, a resin layer 203 formed on the first thin film layer 202, a second thin film layer 204 formed on the resin layer 203, and a transparent substrate 206 laminated on the second thin film layer 204 by means of a transparent layer 205. The resin layer 203 has pits and/or guide grooves formed in configuration of recesses and bumps by transferring process on the side thereof that is opposite to that bonded with the first thin film layer 202 (namely on the surface where the second thin film layer 204 is formed). In this specification, a plurality of layers having the same function will be identified as "first," "second," and so on by counting from one that is nearest to the substrate 201.

The resin layer 203 optically separates the first thin film layer 202 from the second thin film layer 204 so as to ensure that, while information is recorded on or reproduced from one of these thin film layers, information will not be recorded on or reproduced from the other thin film layer. The pits and/or guide grooves formed on the resin layer 203 serve to guide the recording and/or reproducing light beam when information is recorded on the second thin film layer 204 or information is reproduced from the second thin film layer 204. As such, the resin layer 203 may also be referred to as an intermediate layer or a second signal substrate.

The first substrate is formed by injection compression molding process or the like by using a stamper. The first substrate 201 has pits and/or guide grooves on one side thereof which are formed by transferring a configuration of recesses and bumps formed on the stamper surface. The pits and/or guide grooves provide basic information during recording and reproduction of the signals, and the surface having them formed thereon may be called the information surface. The substrate having the pits and/or guide grooves formed thereon may be referred to as the "signal substrate." A thin film layer having such properties that enable it to optically record and reproduce information, including a recording film and a reflective film, is formed on the information surface, thereby forming an information recording layer. The first substrate 201 has a thickness of about 1.1 mm.

The first thin film layer 202 and the second thin film layer 204 include the recording film and the reflective film, as described above, and are formed by a method such as sputtering or vapor deposition. The second substrate (resin layer) 203 is formed from a photo-setting resin by a spin coating method or a screen printing process. The pits and/or guide grooves are formed by laminating a transfer substrate, that has a configuration of recesses and bumps corresponding to the pits and/or guide grooves to be formed, with the side having the configuration of recesses and bumps in contact with the photo-setting resin, before the photo-setting resin is cured. The process of forming the pits and/or guide grooves is completed by peeling the transfer substrate from the photo-setting resin after curing the photo-setting resin by exposing it to light.

Recording of information on the optical recording medium illustrated and reproduction of information from the optical recording medium are carried out by directing recording or reproduction laser beam through the transparent substrate 206. Thus the transparent substrate 206 is formed from a material that is transparent (transmissible) to the recording or reproduction light. The transparent substrate 206 has thickness of about 0.1 mm so that a recording and reproduction head whose numerical aperture is large can be used. The transparent layer 205, provided to bond two substrates 206 and 207 to each other, is formed from a photo-setting resin or an adhesive such as a pressure-sensitive adhesive. The transparent substrate 206 and the transparent layer 205 may be collectively called a cover layer. The cover layer may also be constituted from the transparent resin layer only, without laminating the transparent substrate.

In the multi-layer information recording medium, as described above, the resin layer and the cover layer are generally formed by a spin coating method by using an ultraviolet curable resin or the like (refer to, for example, Japanese Unexamined Patent Publication (Kokai) No. 2005-259331).

Japanese Unexamined Patent Publication (Kokai) No. 2002-63736 discloses an optical information medium that has two or more information holding layers and at least two ring-shaped resin layers that have a ring-shaped ridge on the inner circumference, wherein the resin layers are placed one on another stepwise in such a way that each resin layer does not cover the ring-shaped ridge of another layer. When the resin layers are placed stepwise by the spin coating method for forming the resin layers successively, the resin is not prevented by the ring-shaped ridge from spreading, and thickness of the resin layer does not deviate from the design value in the vicinity of the inner circumference of the disk.

DISCLOSURE OF INVENTION

In order to realize a recording medium having higher density, it has been proposed to form a multi-layer information recording medium (for example, a multi-layer optical disk) by placing information recording layers one on another. To make this medium, a plurality of resin layers must be disposed to separate the information recording layers from each other. As the number of the information recording layers increases, the number of resin layers to be formed therebetween also increases. As a result, adhesion of the resin layer to the transfer substrate which is peeled off and delamination of the resin layer occur at a significant frequency during the process of peeling off the transfer substrate. Since the adhesion of the resin layer onto the transfer substrate makes it impossible to properly separate the information recording layers, and therefore signals cannot be recorded on the two information recording layers that are disposed above and below the resin layer.

Such a problem described above tends to occur when the process of forming the resin layers of two-layer recording medium of the prior art shown in FIG. 2 is applied to the formation process of the resin layers of the multi-layer recording medium. When manufacturing the multi-layer information recording medium, in particular, since the process of forming the resin layer is carried out twice or more, a larger number of the layers makes it difficult to manufacture good media, thus resulting in lower productivity.

The object of the present invention is to solve the problems of the prior art described above and to provide a multi-layer information recording medium that has guide grooves and/or pits formed uniformly over a resin layer formed between information recording layers, and a method for manufacturing the same.

In order to achieve the above object, the present invention provides a multi-layer information recording medium comprising a substrate that has an inner circumference and an outer circumference, three or more information recording layers and resin layers disposed between the information recording layers, wherein positions of the ends on the inner circumference side of the resin layers are different from each other in at least one combination of two neighboring resin layers; and the end on the inner circumference side of at least one of the resin layers is covered by another resin layer(s).

The expression "substrate that has an inner circumference and an outer circumference" means a substrate having an opening at the center, that is ring-shaped (or doughnut-shaped) in general. The "information recording layer" is a layer or a group of layers that enables it to record and reproduce information through the irradiation of light, and includes a recording layer, a reflective film, a protective film that protects the recording layer, an interface layer disposed between the protective film and the recording layer, a light absorption compensation layer disposed between the protective film and the recording layer, etc. that are provided as required. In other words, the information recording layer refers to all layers interposed between two resin layers. The "resin layer" isolates an information recording layer from neighboring information recording layer(s) so that, when information is being recorded on one of the information recording layers, the information will not be recorded on the other information recording layer, as described previously with reference to FIG. 2. The "end on the inner circumference side of the resin layer" is a portion located on the innermost outline among the outlines of each resin layer, and corresponds to the line that defines the inner circumference of the resin layer.

The multi-layer information recording medium of the present invention (may also be referred to simply as a "recording medium" or a "medium" hereinafter) is characterized in that the ends on the inner circumference side of the resin layers are not disposed at the same position along the radial direction of the substrate, and the end on the inner circumference side of at least one resin layer is covered by another resin layer(s). When peeling of the transfer substrate is carried out by starting at the inner circumference of the medium, the force applied to peel off the transfer substrate is concentrated at a point while the resin layers are formed repetitively, in case the ends on the inner circumference side of all the resin layers are located at the same position. In the recording medium of the present invention, the end on the inner circumference side of at least one resin layer is offset in order to avoid the concentration of force. In the recording medium of the present invention, in addition, the end on the inner circumference side of at least one resin layer (referred to as A for convenience) is covered by another resin layer (referred to as B for convenience) that is formed after forming the resin layer A, so as to decrease the force exerted on the resin layer A when the transfer substrate bonded on the resin layer B is peeled off.

The present invention also provides a method for manufacturing the multi-layer information recording medium comprising the substrate that has the inner circumference and the outer circumference, three or more information recording layers and the resin layers disposed between the information recording layers, wherein forming each of the resin layers includes the steps of:

(i) applying a radiation-curing resin on the information recording layer to form an uncured resin layer;
(ii) bonding the transfer substrate that has recesses and bumps on the surface thereof to the uncured resin layer;
(iii) curing the uncured resin layer; and
(iv) peeling the transfer substrate off the surface of the cured resin layer, while the steps (i) to (iv) are repeated (M-1) times (M is the number of information recording layers), in at least step (i), a region to which the radiation-curing resin is to be applied is selected so that the end on the inner circumference side of the uncured resin layer is different from the end on the inner circumference side of the resin layer that has been formed in the previous process operation, and in at least one step (i), a region to which the radiation-curing resin is to be applied is selected so that the end on the inner circumference side of the uncured resin layer covers the end on the inner circumference side of the resin layer that has been formed in the previous process operation. The recording medium of the present invention can be manufactured by this method.

The radiation-curing resin used in the manufacturing method of the present invention is a resin that cures when exposed to a radiation, and the radiation is, for example, ultraviolet ray, visible light, electron beam or X ray. The radiation-curing resin is preferably an ultraviolet curable resin for the reasons of cost and ease of processing. The ultraviolet curable resin is specifically acrylic resin.

While the formations of the resin layers are repeated several times, the region to which the resin is applied may be selected so that the resin makes contact with the substrate when applying the radiation-curing resin in any one or more steps (i), or all the steps (i). This results in such a constitution as the k-th resin layer covers the end on the inner circumference side of the resin layer of the (k−1)th resin layer (k is 2 or larger integer).

According to the multi-layer information recording medium of the present invention and the method for manufacturing the same, it is made possible to reduce the number or the ratio of defects which are caused by the peeling of the transfer substrate bonded to the resin layer when the resin layer is formed as an intermediate layer. Thus the present invention enables it to stably manufacture the multi-layer information recording medium on or from which a large amount of information is recorded or reproduced satisfactorily.

DESCRIPTION OF REFERENCE NUMERALS

Figure 1:
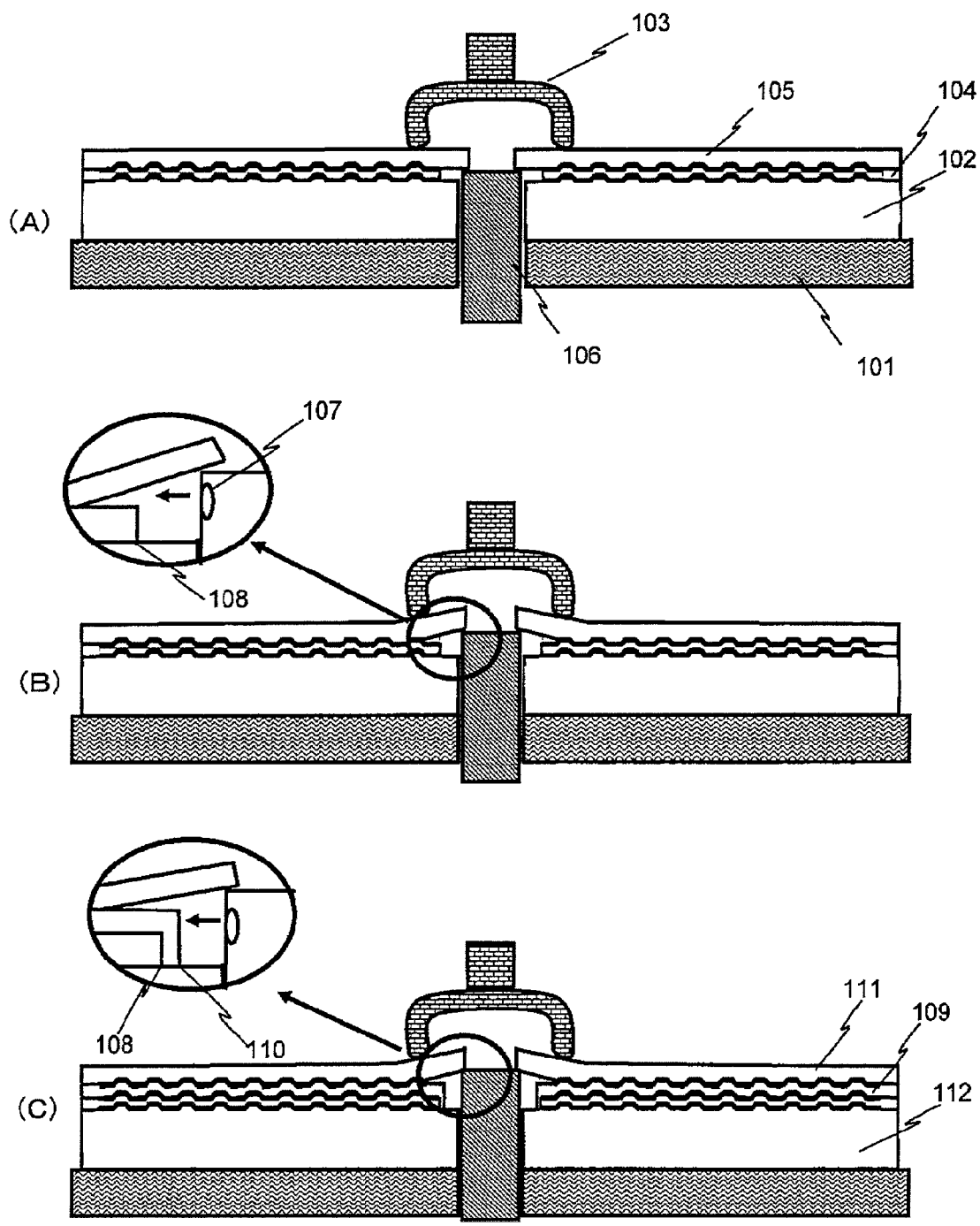
FIGS. 1(A) to 1(C) are sectional views showing the process of peeling off a transfer substrate in the process of manufacturing the recording medium of the present invention.

101 Cable
102 Substrate
103 Suction arm
104 Ultraviolet curable resin
105 Transfer substrate
106 Release pin
107 Air blow outlet
108 End on the inner circumference side
109 Ultraviolet curable resin
110 End on the inner circumference side
111 Transfer substrate
112 Substrate

BEST MODE FOR CARRYING OUT THE INVENTION

The present invention will now be described by way of embodiments thereof with reference to the accompanying drawings. The following description illustrates an example of structure of the information recording medium having disk shape where information is recorded thereon or reproduced therefrom by irradiation of laser beam. The medium of the present invention is not limited to a disk-shaped one.
[Disk Manufacturing Process and Basic Constitution of Resin Layer]

First, a process of producing a four-layer disk will be described as an example of the multi-layer information recording medium and the method for manufacturing the same. The basic constitution of the resin layer will also be described here.

Figure 3:
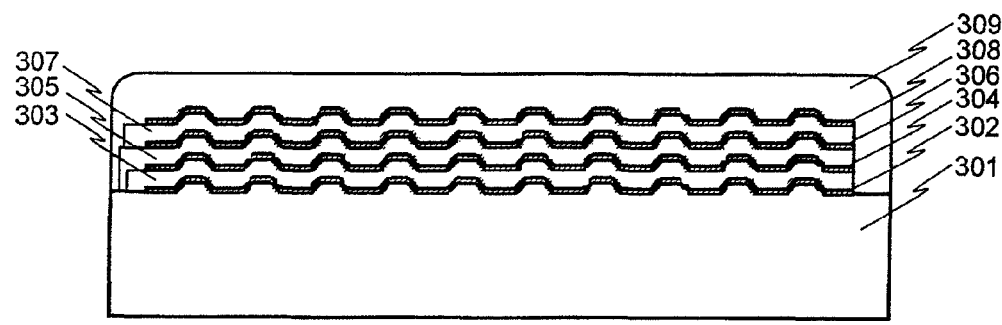
FIG. 3 is a sectional view of the multi-layer information recording medium of the present invention.

FIG. 3 is a sectional view of an example of the four-layer information recording medium of the present invention. The four-layer information recording medium includes a substrate 301 having pits and/or guide grooves formed in configuration of recesses and bumps on one side thereof, a first information recording layer 302 disposed on the surface of the substrate 301 whereon pits or the like are formed, a first resin layer 303 disposed on the first information recording layer 320, a second information recording layer 304 disposed on the first resin layer 303, a second resin layer 305 disposed on the second information recording layer 304, a third information recording layer 306 disposed on the second resin layer 305, a third resin layer 307 formed on the third information recording layer 306, a fourth information recording layer 308 disposed on the third resin layer 307 and a transparent layer 309 disposed on the fourth information recording layer 308. The first resin layer 303, the second resin layer 305 and the third resin layer 307 have recesses and bumps that constitute the pits and/or guide grooves formed on one side thereof that faces away from the substrate 301, while the second information recording layer 304, the third information recording layer 306 and the fourth information recording layer 307 are formed on the surfaces that have the recesses and bumps. The substrate 301 has information required for recording and/or reproduction and is therefore referred to also as "signal substrate." The information recording layer normally comprises a plurality of thin films formed one on another, and is therefore also referred to as "thin film layer."

The substrate 301 is formed with dimensions and material selected so as to prevent the information recording medium from warping, ensure satisfactory rigidity and provide thickness compatibility with optical disks such as CD, DVD and Blu-ray Disk. Specifically, the substrate 301 is formed in a disk of polycarbonate or an acrylic resin having an outer diameter of 120 mm and a thickness of from 1.0 mm to 1.1 mm. The substrate 301 is manufactured by resin molding such as injection compression molding of a resin with the use of a conventional stamper, and pits and/or guide grooves are formed in configuration of recesses and bumps on one side thereof. The substrate has, at the center thereof, a center hole (not shown) having a diameter of 15 mm for holding and rotating the disk by a player while signals are recorded or reproduced. A diameter of the center hole defines the inner circumference of the substrate. A process wherein the substrate 301 is made of polycarbonate is used will be described here.

The resin layers 303, 305, 307 and the transparent layer 309 are formed from a radiation-curing resin on the substrate 301. In this embodiment, an ultraviolet curable resin is used as the radiation-curing resin. The same applies to other embodiments. However, it needs not to say that the resin layers may also be formed from another type of radiation-curing resin.

When the resin materials have been stacked, the substrate 301 tends to warp and become concave on the information surface side due to the light curing shrinkage that is peculiar to the ultraviolet curable resin, in the information recording medium after forming the layers. For this reason, the substrate 301 is made to warp in convex shape on the information surface side as a whole in advance, so that the information recording medium becomes flat after forming the resin layers 303, 305, 307 and the transparent layer 309 have been formed.

The first information recording layer 302 is formed from a metal, semiconductor or dielectric material such as Al, Ag, Au, Si, $SiO_2$ by sputtering, vapor deposition or the like. The same applies also to the second information recording layer 304, the third information recording layer 304 and the fourth information recording layer 306. The layers to be formed as the information recording layer vary depending on the type of the medium, while the method of forming each of the layers is well known, and therefore detailed description thereof will be omitted here.

The first resin layer 303 is formed from an ultraviolet curable resin that is substantially transparent (permeable) to the recording or reproduction light. The ultraviolet curable resin is one that has curing light wavelength in the ultraviolet region. The ultraviolet curable resin cures when irradiated with ultraviolet ray, but does not cure when irradiated with light of wavelength other than ultraviolet, and is therefore used advantageously in controlling the shape of the resin layer. The second resin layer 305 and the third resin layer 307 are also formed from the same material as that of the first resin layer 303. Specifically, the ultraviolet curable resin exemplified above may be used.

The transparent layer 309 is substantially transparent (permeable) to the recording or reproduction light, and is formed from an ultraviolet curable resin that contains an acrylic resin, for example, as the main component that. The transparent layer 309 is formed by applying the ultraviolet curable resin in liquid phase on the fourth information recording layer 308, and irradiating it with ultraviolet ray. The transparent layer 309 is formed so that it covers the resin layers and the information recording layers, and bonds with the substrate on the inner circumference and the outer circumference.

The method of forming the resin layers will now be described more specifically.

The resin layers are formed with thickness of about 10 μm. However, the thickness of the resin layer is not limited to this value, and may be from 5 μm to 30 μm. Spin coating, screen printing, offset printing, ink jet process or the like may be suitable for forming the resin layer of such a thickness. When manufacturing the medium of the present invention, there is not restriction on the method of applying the resin, as long as the resin can be applied uniformly and bubbles or other defects would not be formed in the resin.

When manufacturing the medium of the present invention, it is required to control the position of the end on the inner circumference side of the resin layer as will be described later. Spin coating process is a process wherein the resin is dripped on the inner circumference side and is spread by the centrifugal force. When the spin coating process is employed, position of the end on the inner circumference side of the resin layer can be controlled by selecting the proper position where the resin is dripped. When the offset printing or the ink jet process is employed, position of the end on the inner circumference side of the resin layer can be controlled by designing the position on the inner circumference where the resin is dripped.

Figure 4:
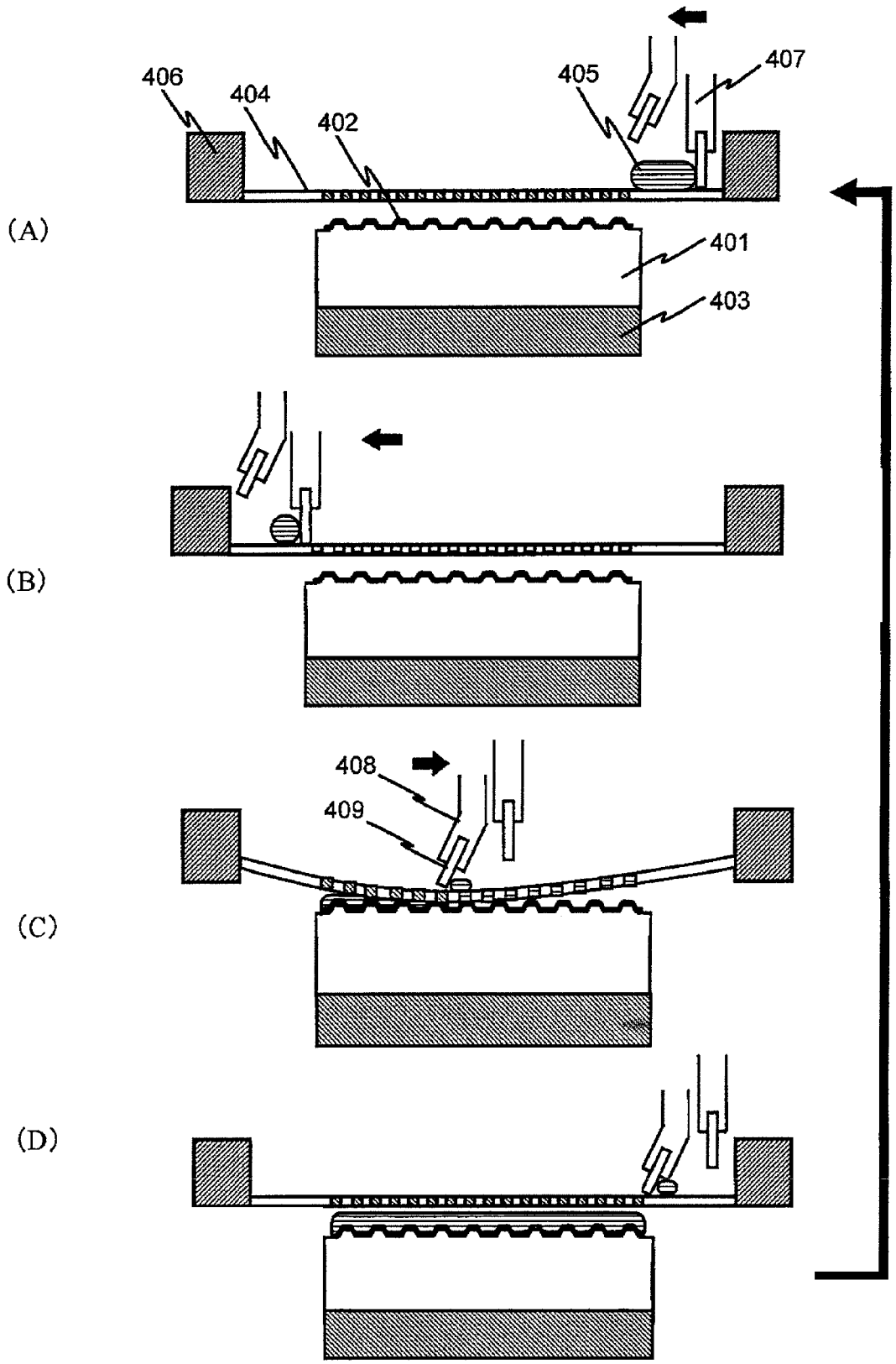
FIGS. 4(A) to 4(D) are sectional views showing the method of forming resin layers by screen printing process.

As a preferable example of method for applying the resin, the screen printing process will now be described in detail with reference to FIG. 4. The screen printing process is carried out in the following procedure. A substrate 401 having a first information recording layer 402 formed thereon is fastened onto a turntable 403 by vacuum sucking or the like (refer to FIG. 4(A)), and a screen frame 406 is fastened thereon. Then an ultraviolet curable resin 405 is supplied to an area where there is not the hole, and a screen 404 is filled with the resin by sliding a scraper 407 (refer to FIG. 4(B)).

Then a squeegee 409 held by a squeegee holding fixture 408 moves sliding while applying a pressure on top of the screen 404, so as to squeeze the ultraviolet curable resin 405 through apertures of the screen 404 onto the substrate 401 (refer to FIG. 4(C)). This operation of the so-called screen printing enables it to obtain the substrate coated with the resin (refer to FIG. 4(D)). A plurality of the substrates coated with the resin can be obtained by changing the substrate 401 and repeating the steps shown in FIGS. 4(A) to 4(D).

Figure 5:
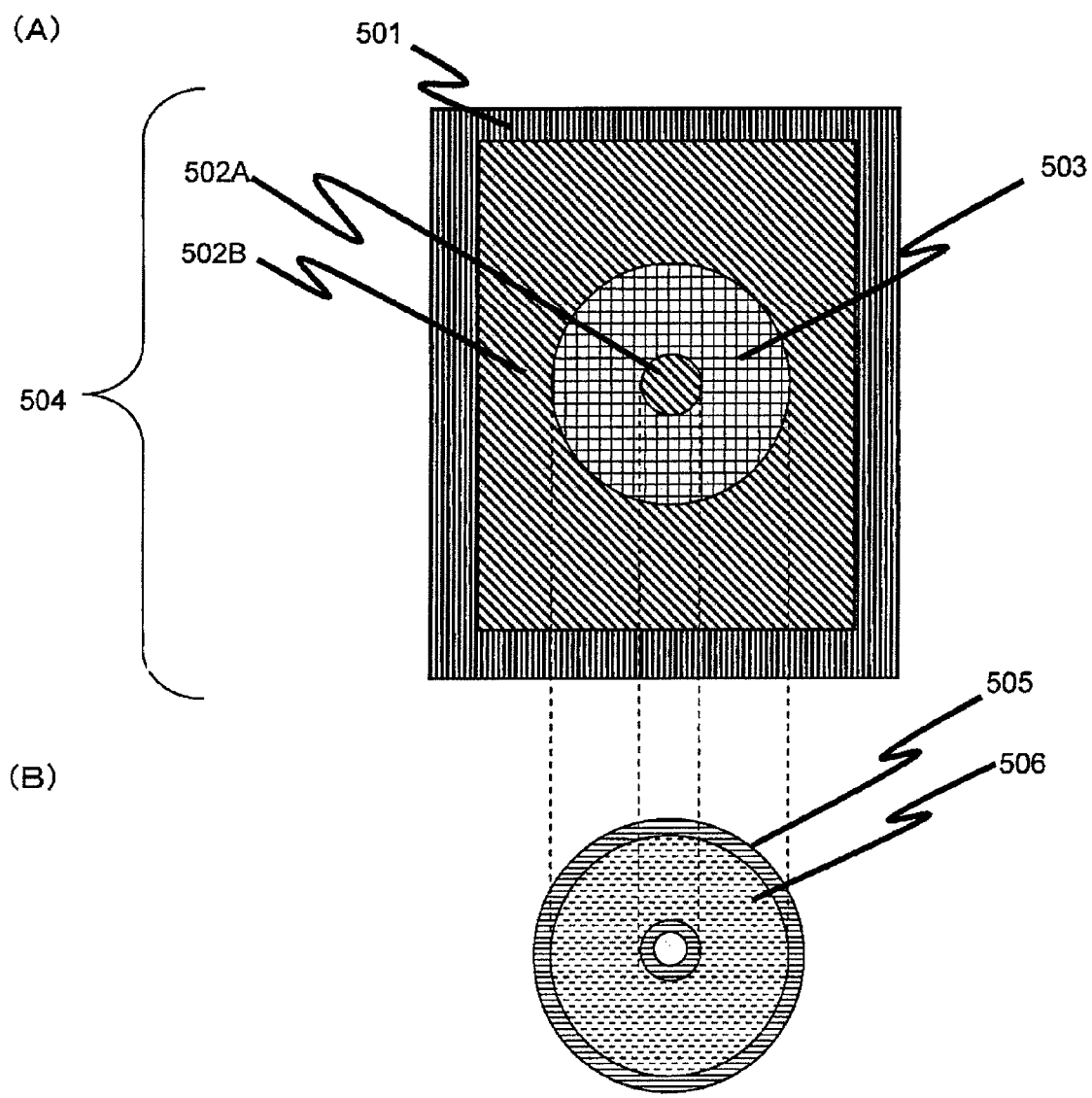
FIG. 5(A) is a schematic diagram of a screen.
FIG. 5(B) is a plan view showing a region to which resin is applied.

Configuration of the screen 504 and the extent of the resin layer to be formed will now be described with reference to FIG. 5. In order to form the resin layer only in a predetermined area, the screen 504 is used with portions thereof being blocked, which portions are other than those corresponding to the area where resin layer is to be formed. Predetermined portions of the screen 504 is blocked as follows. First, a gauze that forms the screen is set up on the screen frame 501, and the surface of the screen is coated with a photo-sensitive emulsion. Then the coated screen is masked except for the predetermined area (where the resin layer is to be formed) with a light-shielding mask, and is irradiated with ultraviolet ray by means of an exposure apparatus for a predetermined period of time. Then the photo-sensitive emulsion exposed to ultraviolet ray is washed away by water jet or the like, to develop the latent image.

Figure 2:
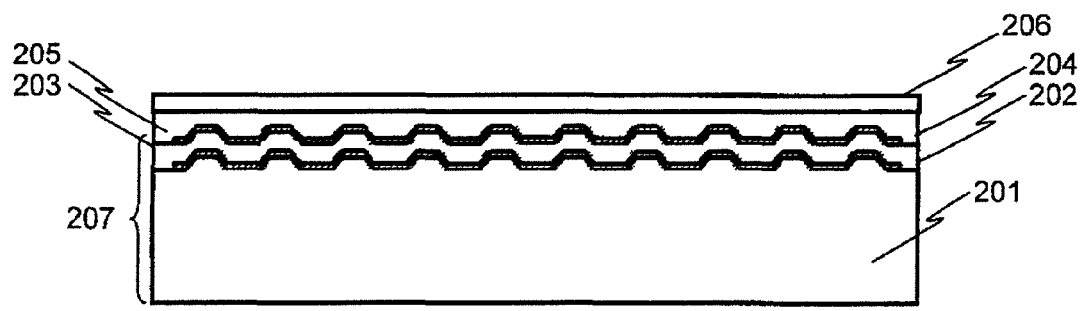
FIG. 2 is a sectional view of a conventional multi-layer information recording medium.

The photo-sensitive emulsion remains in the portions that have been shielded by the mask from exposure, and blocks the apertures of the gauze. These portions correspond to regions represented by 502A and 502B in FIG. 2. The area where the gauze is exposed in the exposure process is a region represented by 503.

The screen frame 501 may be formed from such a material as wood, aluminum, stainless steel or plastics. In particular, aluminum that is light in weight and has high rigidity is preferably used. The gauze that constitutes the screen may be formed from silk, Nylon®, Tetron®, V Screen® or stainless steel. V Screen is preferably used for the resilience to restore itself to the original form against an extraneous force. The photo-sensitive emulsion may be prepared by dissolving a diazonium salt or a bichromate in PVA or vinylacetate emulsion. Mesh number (number of lines per inch) at the predetermined position of the screen is preferably from 100 to 600. Mesh number in this range makes it possible to apply a resin-containing material without bad passing of the resin-containing material and unevenness in application. Apertures of the screen are not restricted to the mesh formed by lines.

In this embodiment, the screen frame 501 formed from aluminum is used and V Screen is used as the screen 504 so as to reduce the load on the substrate. It needs not to say that the screen frame 501 formed from another material and/or the gauze formed from another material may be used.

Use of a resin having low viscosity in the screen printing process may cause such troubles as the resin flows after being applied, resulting in spillover of the resin from the edge of the substrate or swell of the resin. When viscosity of the resin is too high, it becomes difficult to transfer the resin through the screen. Viscosity of the resin is preferably in a range from 30 to 10,000 cps when considering the possibility of the viscosity of the resin to decrease due to changes in temperature and humidity during the process.

The area of the substrate 505 wherein the ultraviolet curable resin is applied can be controlled by selecting the position and shape of the region 503 of the screen 504 where the gauze is exposed. When the screen 504 is used, position of the end on the inner circumference side of the resin layer to be formed can be controlled by changing the position of the border between the regions 503 and 502A. When the resin is applied to the substrate 505 by the screen printing process employing the screen 504, the area where the resin is applied becomes as indicated with 506.

Figure 6:
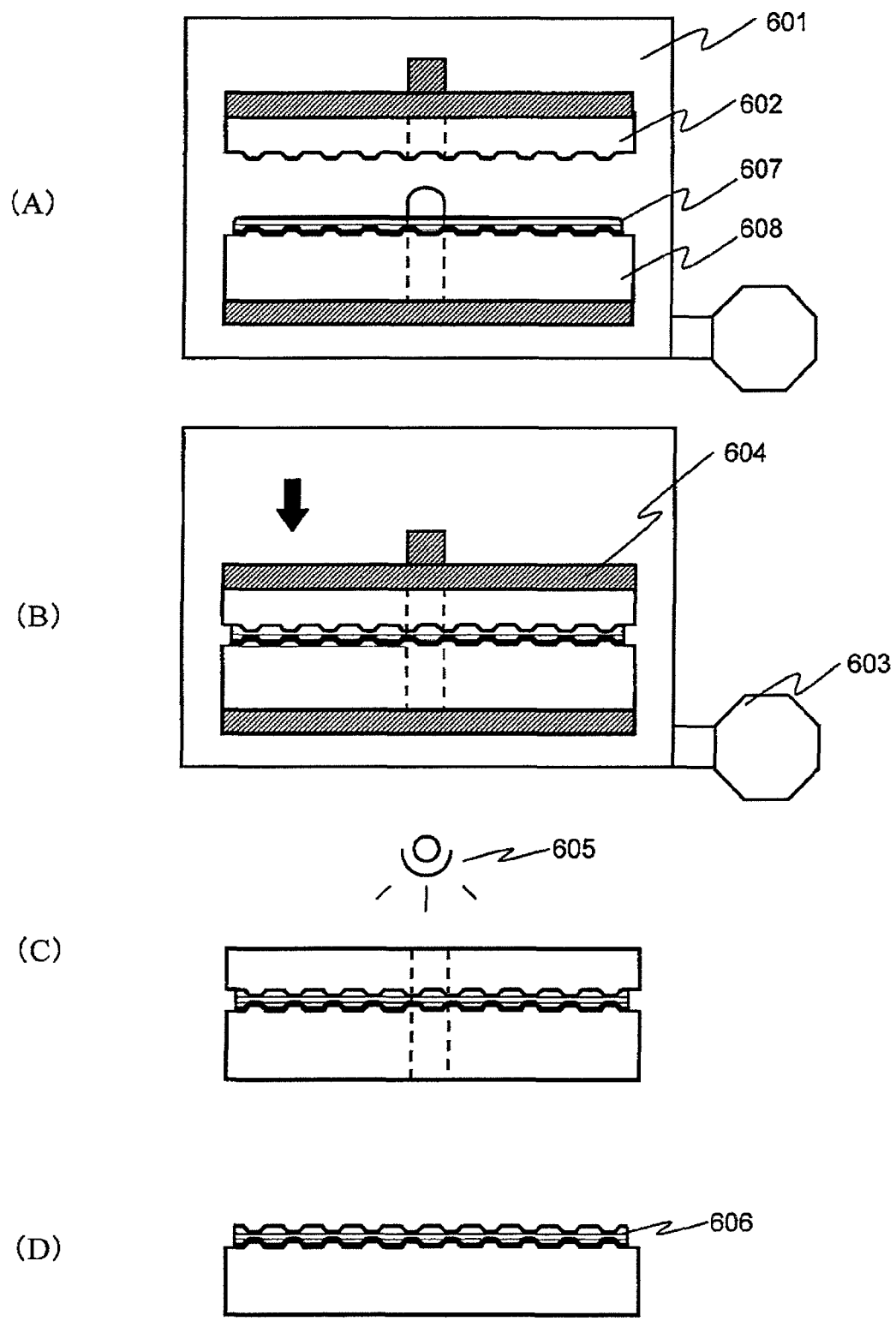
FIGS. 6(A) to 6(D) are sectional views showing the process of bonding the transfer substrate to the resin layer.

The process of forming the guide grooves and pits on the resin layer will now be described with reference to FIG. 6. A first substrate 608 whereon application of the ultraviolet curable resin 607 has been completed is transferred into a vacuum chamber 601. A transfer substrate 602 is also transferred into the vacuum chamber 601 at this time.

The transfer substrate 602 is formed from a polyolefin resin of which release characteristic from the ultraviolet curable resin 607 is favorable. The transfer substrate 602 has a thickness of about 0.6 mm. This thickness is selected for the purpose of warping the transfer substrate 602 so as to peel off the transfer substrate 602 from the first substrate 608 that has thickness of 1.1 mm by making use of the difference in rigidity due to the difference in thickness.

Polyolefin resin is preferably used since the pits and/or guide grooves in configuration of recesses and bumps are easily formed on one side in a resin molding process such as injection compression molding by using a conventional stamper, similarly to the molding process of the first substrate 608. Polyolefin resin also has high permeability to ultraviolet ray. The ultraviolet curable resin is irradiated with ultraviolet ray through the transfer substrate 602 as shown in FIG. 6(D), and therefore the transfer substrate 602 formed from polyolefin resin enables the ultraviolet curable resin it to be cured efficiently. Similar effect can be achieved also by using polycarbonate instead of polyolefin resin.

The transfer substrate 602 has a center hole (refer to FIG. 6(A)) formed at the center thereof. The center hole is provided for the purpose of aligning the center of the transfer substrate 602 and the center of the first substrate 608 via a center boss.

Inside of the vacuum chamber 601 is evacuated by means of a vacuum pump 603 such as a rotary pump or a mechanical booster pump, and achieves vacuum atmosphere in a short period of time. When a degree of vacuum of 100 Pa or lower has been achieved in the vacuum chamber 601, the transfer substrate 602 is placed on the first substrate 608. Then a pressure is applied to the transfer substrate 602 using a pressure plate 604 that is disposed above the transfer substrate 602. Thus signals formed on the transfer substrate 602 are transferred onto the ultraviolet curable resin 607. Since the vacuum atmosphere is formed inside the chamber 601, the ultraviolet curable resin 607 and the transfer substrate 602 can be bonded together without bubbles formed therebetween (refer to FIG. 6(B)).

The first substrate 608 and the transfer substrate 602 that have been bonded together are removed from the vacuum chamber 601. Then the ultraviolet curable resin is irradiated with ultraviolet ray all over the surface thereof so that the resin 607 is cured. The irradiation is conducted using an ultraviolet irradiation apparatus 605 disposed above the transfer substrate 602. The ultraviolet ray is applied passing through the transfer substrate 602. Then compressed air is blown between the transfer substrate 602 and the ultraviolet curable resin 607 to peel off the transfer substrate 602. Through these steps, the resin layer 606 having the pits and/or the guide grooves is formed.

For the process of peeling the transfer substrate, such methods has been proposed as comprising a) inserting a jig between the substrate and the transfer substrate and blowing compressed air to separate the substrates, and b) peeling off the transfer substrate with the inner circumference as the start point, with the use of an inner circumference-protruding portion of the substrate as the starting portion of peeling, in which method the transfer substrate is used whose diameter is smaller than the diameter of the center hole of the transfer substrate so that the inner circumference portion thereof is made the protruding portion. While there is not restriction on the method of peeling off, the method b) will be described in more detail with reference to FIG. 1.

First, the substrate 102 is placed on a table 101, and a suction arm 103 is disposed above thereof. The ultraviolet curable resin 104 and the transfer substrate 105 are placed on the substrate 102. At this time, the ultraviolet curable resin 104 has already cured.

The table 101 has suction holes (not shown) formed on the surface that makes contact with the substrate 102, so that the substrate 102 can be fixed onto the table 101 by reducing the pressure. The suction arm 103 also has suction holes (not shown) formed on the side facing the transfer substrate 105 so that the suction arm 103 can be fixed onto the transfer substrate 105 by reducing the pressure. An inner diameter of the substrate 102 is 15 mm, and an inner diameter of the transfer substrate 105 is 13 mm. As a result, the hole of the transfer substrate 105 protrudes by 1 mm in the center hole (FIG. 1(A)). A release pin 106 is provided in the table so as to pass through the center hole.

Peeling operation is carried out by the following procedures. First, the substrate 102 is fixed onto the table 101, and the suction arm 103 is fixed onto the transfer substrate 105. Then the release pin 106 is moved upward (FIG. 1(B)), and the suction arm 103 is moved upward at the same time. Since thickness of the transfer substrate 105 has a smaller thickness and lower rigidity than those of the first substrate 102, the transfer substrate 105 warps as illustrated.

Then as illustrated by the enlarged view of FIG. 1(B), compressed air is blown out of an air blow outlet 107 provided in the releaser pin 106 in the direction indicated by arrow in the drawing. The compressed air allows the transfer substrate 105 to be peeled off from the ultraviolet curable resin 104. Two or more air blow outlets may be provided along the outer circumference of the releaser pin.

In the peeling process described above, failure in peeling is likely to occur in an end 108 on the inner circumference side. Whether the ultraviolet curable resin 104 that has cured remains on the first substrate 102 or adheres to the transfer substrate 105, depends on the bonding strength between the end 108 on the inner circumference side and the first substrate 102. When the bonding strength is weak at the end 108 on the inner circumference side, the ultraviolet curable resin 104 adheres onto the transfer substrate 105, thus resulting in defective medium. Bonding strength between the ultraviolet curable resin 104 and the transfer substrate 105 decreases when a force to peel off is applied repetitively on the same point, which makes it difficult to manufacture the multi-layer information recording medium.

In the manufacture of the multi-layer information recording medium, it is necessary to peel off the signal transfer substrate every time the resin layer is stacked since a plurality of resin layers are stacked in the multi-layer information recording medium. This means that the greater the number of layers to be formed, the greater the force applied to the end 108 on the inner circumference side when peeling off. Thus repetition of the peeling operation becomes the cause of defect brought about during the peeling operation. Accordingly, in this embodiment, when the resin layers are formed one on another from ultraviolet curable resin, position of the end on the inner circumference side of each resin layer is varied to prevent the bonding strength from decreasing locally.

FIG. 1(C) shows the substrate 112 being placed on the peeling table and prodded upward by the release pin 106, after the second information recording layer (not shown) is formed, the ultraviolet curable resin 109 is applied for the second time, the transfer substrate 111 is adhered to the ultraviolet curable resin 109 and irradiation of ultraviolet ray has been completed. The end 110 on the inner circumference side of the ultraviolet curable resin 109 is located nearer to the inner circumference of the substrate 112 than the end 108 on the inner circumference side of the first resin layer 104. That is, a diameter of the inner circumference of the resin layer formed by the ultraviolet curable resin 109 is smaller than the diameter of the inner circumference of the resin layer 104. Position of end on the inner circumference side of the resin layer can be easily controlled by changing the pattern of the emulsion applied onto the screen.

When the transfer substrate 111 bonded to the second ultraviolet curable resin layer is peeled off, the greatest force of peeling is exerted on the end 110 on the inner circumference side of the ultraviolet curable resin 109 of the second resin layer, at the instant the substrate is prodded up by the release pin 106. As a result, the force of peeling exerted on the end 108 on the inner circumference side of the first resin layer 104 can be decreased. Due to this effect, the ultraviolet curable resin 109 is prevented from adhering to the transfer substrate 111 during the peeling process, thereby significantly reducing the probability of peeling failure to occur.

As illustrated, the ultraviolet curable resin 109 covers the end 108 on the inner circumference side of the first resin layer 104. Thus by covering the end on the inner circumference side of the first resin layer, load exerted on the end 108 on the inner circumference side of the resin layer 104 can be decreased when the transfer substrate 111 bonded to the ultraviolet curable resin 109 is peeled off.

In order to obtain the four-layer information recording medium as shown in FIG. 3, it is necessary to form one more resin layer. The third resin layer may be formed such that the end on the inner circumference side thereof is located at a position different from the end on the inner circumference side of the second resin layer, or located at the same position as the end on the inner circumference side of the second resin layer. The effect of the present invention can be sufficiently achieved by such a constitution as, in at least one combination (the combination of the first resin layer and the second resin layer in FIG. 1(D)) among the combinations of two adjacent resin layers, positions of the ends on the inner circumference side of the resin layers are different from each other and the end on the inner circumference side of at least one resin layer (the first resin layer in FIG. 1(D)) is covered by another resin layer (the second resin layer FIG. 1(D)). Therefore, position of the end on the inner circumference side of the second resin layer and position of the end on the inner circumference side of the third resin layer may be aligned with each other. In the embodiment shown in FIG. 3, the end on the inner circumference side of the third resin layer is located between the end on the inner circumference side of the first resin layer and the end on the inner circumference side of the second resin layer. More specific embodiments of the recording mediums of the present invention will be described below.

First Embodiment

Figure 7:
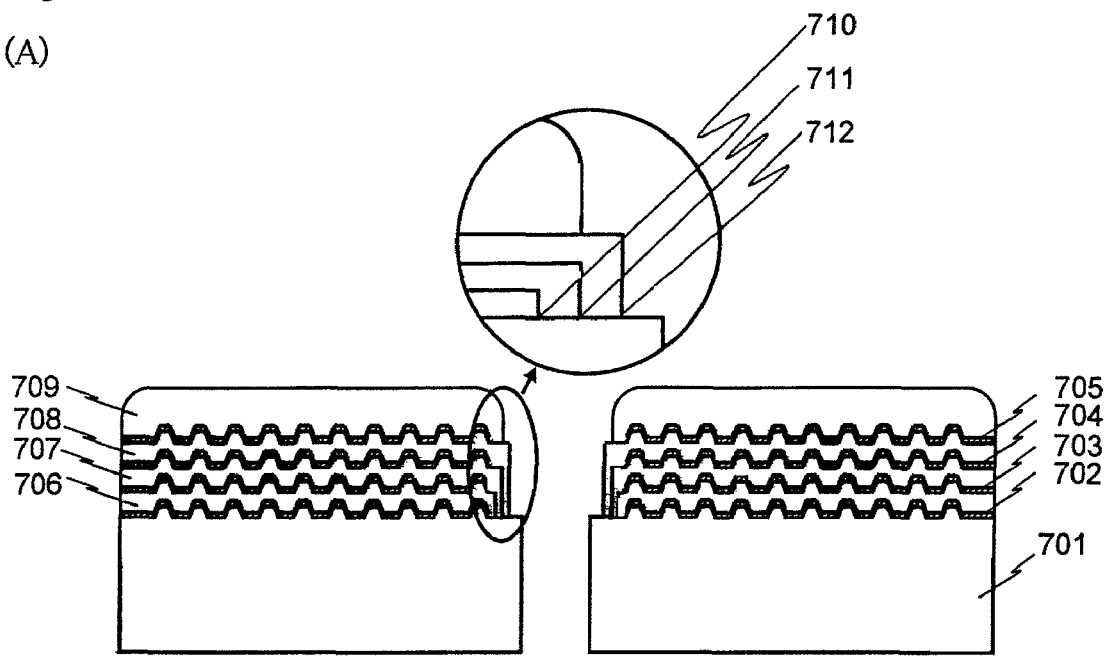
FIGS. 7(A) and 7(B) are sectional views showing examples of multi-layer information recording mediums of the present invention.
Figure 7:
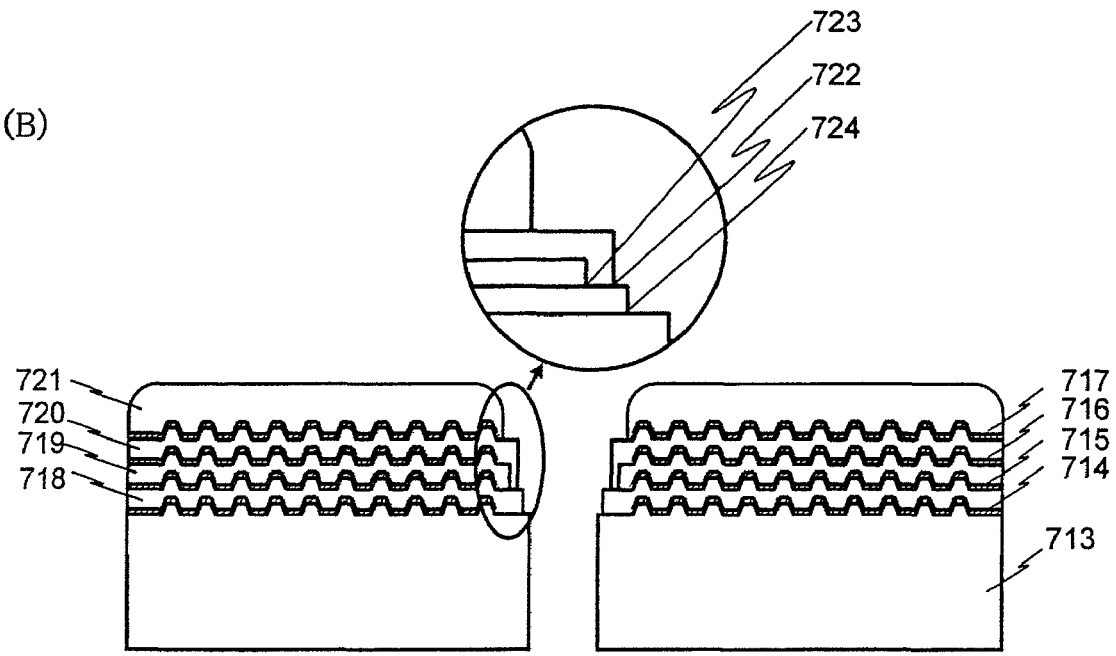

FIG. 7(A) shows one embodiment of the four-layer information recording medium in sectional view. This drawing is a sectional view of the information recording medium constituted from a first information recording layer 702, a first resin layer 706, a second information recording layer 703, a second resin layer 707, a third information recording layer 704, a third resin layer 708, a fourth information recording layer 705 and a protective layer 709 that are stacked in this order on a substrate 701.

In this embodiment, positions of the ends on the inner circumference side of the resin layers are all made different and the ends on the inner circumference side of all the resin layers are in contact with the substrate 701. For example, when the inner diameter of the substrate 701 (diameter of the center hole) is 15 mm, three resin layers may be formed so that the inner diameter of the first resin layer 706 (equal to the diameter of a circle defined by the end on the inner circumference side) is 23 mm, the inner diameter of the second resin layer 707 is 22 mm, and the inner diameter of the third resin layer 708 is 21 mm.

Actually, however, a center of the circle formed by the end on the inner circumference side and the center of the substrate may be offset from each other. Also there may be such a case as the profile of the end on the inner circumference side is not a true circle and has a deformed or oval shape. Accordingly, the end on the inner circumference side ranges in position, and it may be deviated by about 500 μm. Deviations of such an extent are tolerable. In order to achieve the anticipated effect, it is preferable that distance between two ends on the inner circumference side (distance along the radius of the substrate) is 100 μm or more in a combination of neighboring resin layers.

When manufacturing the multi-layer recording medium of this embodiment, a large peeling force is exerted as the transfer substrate is peeled off when forming the resin layers. In case the resin layers are formed as in the embodiment illustrated, the place where the peeling force is exerted differs for each resin layer. The place where the greatest peeling force acts is shown in the enlarged view of FIG. 7(A). In the process of peeling off the transfer substrate when forming the first resin layer 706, a load of peeling is applied to the end 710 on the inner circumference side of the first resin layer 706. In the process of peeling off the transfer substrate when forming the second resin layer 707, a load is applied to the end 711 on the inner circumference side of the second resin layer 707. Similarly, in the process of peeling off the transfer substrate when forming the third resin layer 708, a load is applied to the end 712 on the inner circumference side of the third resin layer 708. In this way, loading at one place upon the peeling can be mitigated or prevented from occurring by a constitution wherein positions of the ends on the inner circumference side of all resin layers are different.

Further in this embodiment, the end 710 on the inner circumference side of the first resin layer is covered by the second resin layer 707 and is bonded therewith, and the end 711 on the inner circumference side of the second resin layer 707 is covered by the third resin layer 708 and is bonded therewith. This constitution lightens the load applied to the end on the inner circumference side of the first resin layer 706 when forming the second resin layer 707 and the third resin layer 708, as well as the load applied to the end on the inner circumference side of the second resin layer 707 when forming the third resin layer 708.

The effect provided by the constitution shown in FIG. 7(A) is achieved more conspicuously when the value of M (number of the information recording layers) is greater. Since a greater value of M means more resin layers, the end on the inner circumference side of the resin layer formed previously (for example, the first resin layer) is subjected to repetitive peeling forces. With this constitution, the ends on the inner circumference side of all resin layers up to the (M−2)th resin layer are covered, and all ends on the inner circumference side are located at the different positions in the radial direction of the substrate, thus enabling it to effectively prevent defects.

Such a constitution as described above also makes it possible to decrease or eliminate the steps produced by offsetting the positions of the ends on the inner circumference side of the resin layers. In the medium shown in FIG. 7(A), for example, there is no step produced by the resin layers after forming the three resin layers. In the medium shown in FIG. 7(B) to be described later, one step is produced by the resin layers after forming the three resin layers. When three resin layers are formed such that the inner diameter of the first resin layer is smaller than the inner diameter of the second resin layer which is smaller than the inner diameter of the third resin layer, in contrast, two steps are produced.

The step produced by the resin layers affects the appearance of the finished cover layer that is formed thereon. For example, when the cover layer is formed by means of a sheet and an adhesive that bonds the sheet to the cover layer, presence of the step at the end of the resin layer makes bubbles easier to enter. Also in case the cover layer is formed by, for example, the spin coating process as the protective layer 709, stability of a cap placed near the center hole is determined by the shape of the end on the inner circumference side of the resin layer. For this reason, it is preferable to form the resin layer in a smoother shape with less steps, so that it becomes easier to place the cap and hold it horizontally.

In general, the resin layers that adjoin each other in the optical information recording medium are integrated by bonding directly with each other without information recording layer interposed therebetween in the inner circumferential portion and the outer circumferential portion of the substrate. As a result, peeling the transfer substrate causes a force applied not only to the resin layer to which the transfer substrate is bonded but also to the underlying resin layer that is integrated therewith, and the underlying resin layer may move together with the upper resin layer toward the transfer substrate (namely, peel off). In the recording medium of the present invention, two or more resin layers are formed so as to distribute the load exerted thereon during peel operation, and therefore peel-off of the resin is less likely to occur even when the resin layers that adjoin each other are adhesively bonded. The resin layers are bonded with each other in an annular region between a position in a range of diameters from 18 mm to 34 mm, preferably from 18 mm to 26 mm and a position where the information recording layer begins (diameter of about 42 mm) in the inner circumferential region, and in an annular region between diameters of 119 mm and 120 mm in the outer circumferential region.

Formation of the protective layer 709 does not involve the process of transferring the recesses and bumps and the guide grooves and the process of peeling the transfer substrate, and therefore there is no need of restricting the position of the end on the inner circumference side of the layer 709. Therefore, position of the end on the inner circumference side of the protective layer 709 may be set nearer to the outer circumference of the substrate than the end on the inner circumference side of the third resin layer 708 as illustrated, or may be set nearer to the inner circumference of the substrate than the end on the inner circumference side of the third resin layer 708, so as to cover the entire resin layers 706, 707 and 708.

The recording medium of this embodiment is manufactured by a method that includes the process of peeling the transfer substrate from the center hole, and therefore the ends on the inner circumference side of the resin layers are constituted as described above by taking into account the load applied to end on the inner circumference side of each resin layer. In another embodiment, end on the outer circumference side of the resin layer may be formed in a similar constitution. This applies to all embodiments to be described later.

The resin layers are formed by the screen printing process as described previously. Alternatively, the resin layers may also be formed by the spin coating process. When the spin coating process is employed, however, the cap makes contact with the end on the inner circumference side of the resin layer, and therefore positional stability of the cap may decrease when the positions of the ends on the inner circumference side of the resin layers are not aligned. For this reason, the screen printing process is preferably employed when forming the resin layers, or ink jet process may be preferably employed.

Second Embodiment

FIG. 7(B) shows another embodiment of the four-layer information recording medium in sectional view. This drawing is a sectional view of the information recording medium constituted from a first information recording layer 714, a first resin layer 718, a second information recording layer 715, a second resin layer 719, a third information recording layer 716, a third resin layer 720, a fourth information recording layer 717 and a protective layer 721 stacked in this order on a substrate 713.

In this embodiment, too, positions of the ends on the inner circumference side of the resin layers are all made different in order to prevent defects from occurring during peel operation. Specifically, the end on the inner circumference side of the first resin layer 718 is located nearest to the inner circumference of the substrate 713, the end on the inner circumference side of the second resin layer 719 is located nearer to the outer circumference of the substrate than the end on the inner circumference side of the first resin layer 718, the end on the inner circumference side of the third resin layer 720 is located nearer to the inner circumference of the substrate than the end on the inner circumference side of the second resin layer 719, and the third resin layer 720 covers the end on the inner circumference side of the second resin layer 719. The end on the inner circumference side of the third resin layer 720 is located nearer to the outer circumference of the substrate than the end on the inner circumference side of the first resin layer. For example, when the inner diameter of the substrate 701 is 15 mm, three resin layers may be constituted such that the inner diameter of the first resin layer 718 (equal to the diameter of a circle defined by the end on the inner circumference side) is 21 mm, the inner diameter of the second resin layer 719 is 22 mm, and the inner diameter of the third resin layer 720 is 21.5 mm.

When manufacturing the multi-layer information recording medium of this embodiment, too, a large peeling force is exerted during the peel operation of the transfer substrate which operation is made for forming the resin layers. The place where the peeling force is exerted will be described below with reference to the enlarged view of FIG. 7(B). In the process of peeling off the transfer substrate when forming the first resin layer 718, a load is applied to the end 724 on the inner circumference side. In the process of peeling off the transfer substrate when forming the second resin layer 719, a load is applied to the end 723 on the inner circumference side. In the process of peeling off the transfer substrate when forming the third resin layer 720, a load is applied to the end 722 on the inner circumference side. Also in this embodiment, position where load is exerted when forming the resin layer differs for each resin layer, resulting in reduction in defects generated during the peel operation.

In this embodiment, as shown in FIG. 7(B), the end 723 on the inner circumference side of the second resin layer 719 is covered by the first resin layer 718 and is bonded therewith.

With this constitution, the force applied to the end 723 on the inner circumference side of the second resin layer 719 can be further reduced when forming the third resin layer 720.

In the recording medium of this embodiment, too, the resin layers that adjoin each other are bonded directly with each other without information recording layer interposed therebetween in the inner circumferential portion of the substrate. Also in the recording medium of this embodiment, similarly to the first embodiment, positions of the ends on the inner circumference side of the resin layers are different in a combination of neighboring resin layers (namely, the combination of the first resin layer and the second resin layer and the combination of the second resin layer and the third resin layer) and positions of the ends on the inner circumference side are all different, whereby defects are less likely to occur in the process of peeling off the transfer substrate.

Formation of the protective layer 721 does not involve the process of transferring the recesses and bumps and the guide grooves and the process of peeling the transfer substrate, and therefore there is no restriction on the position of the end on the inner circumference side thereof. As illustrated, the position of the end on the inner circumference side of the protective layer 721 may be nearer to the outer circumference of the substrate than the end on the inner circumference side of the third resin layer 720.

Modifications of the first and second embodiments will now be described. FIGS. 10(A) to 10(F) are referred to for illustrating the possible position of the end on the inner circumference side of each resin layer in the case of a three resin-layer stack. For the ease of understanding, only the constitution of the vicinity of the inner circumference of the substrate will be shown in these drawings, where only substrates 1000, 1010, 1020, 1030, 1040, 1050, first resin layers 1001, 1011, 1021, 1031, 1041, 1051, second resin layers 1002, 1012, 1022, 1032, 1042, 1052, third resin layers 1003, 1013, 1023, 1033, 1043, 1053, ends 1004, 1014, 1024, 1034, 1044, 1054 on the inner circumference side of the first resin layers, ends 1005, 1015, 1025, 1035, 1045, 1055 on the inner circumference side of the second resin layers, and ends 1006, 1016, 1026, 1036, 1046, 1056 on the inner circumference side of the third resin layers are shown.

Figure 10:
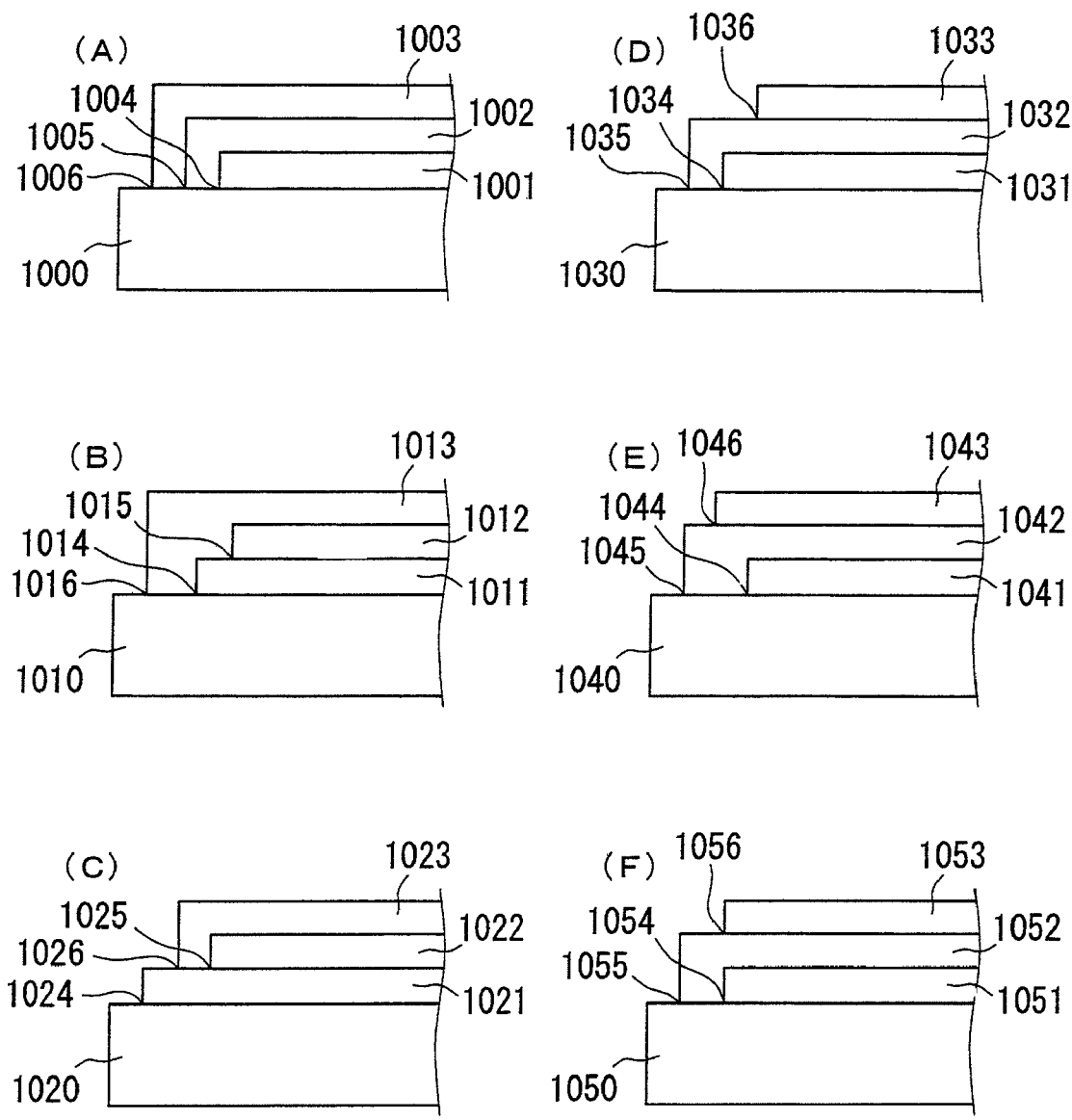
FIGS. 10(A) to 10(F) are sectional views showing examples of the recording mediums of the present invention.

The constitution shown in FIG. 10(A) corresponds to the first embodiment, and is the same as the constitution shown in FIG. 7(A). In every combination of adjacent resin layers, positions of the ends on the inner circumference side of the resin layers are different from each other, and the ends on the inner circumference side of all the resin layers are located at different positions in the radial direction of the substrate, and the ends 1004, 1005 and 1006 on the inner circumference side of all the resin layers are in contact with the substrate 1000. The end 1004 on the inner circumference side of the first resin layer 1001 is covered by the second resin layer 1002, and the end 1005 on the inner circumference side of the second resin layer is covered by the third resin layer 1003.

FIG. 10(B) shows such a constitution as, positions of the ends on the inner circumference side of the resin layers are different from each other in every combination of neighboring resin layers, and the ends on the inner circumference side of all the resin layers are placed at different positions in the radial direction of the substrate, while the end 1014 on the inner circumference side of the first resin layer 1011 and the end 1015 on the inner circumference side of the second resin layer 1012 are covered by the third resin layer 1013. The end 1016 on the inner circumference side of the third resin layer 1013 is located nearest to the inner circumference of the substrate 1010. In this constitution, too, the three resin layers do not form a step, thus providing good appearance of the cover layer, similarly to that shown in FIG. 9(A) (FIG. 7(A)).

The constitution shown in FIG. 10(C) corresponds to the second embodiment, and is the same as the constitution shown in FIG. 7(B). In every combination of adjacent resin layers, positions of the ends on the inner circumference side of the resin layers are different from each other, and the ends on the inner circumference side of all the resin layers are located at different positions in the radial direction of the substrate, while the end 1024 on the inner circumference side of the first resin layer 1021 is located nearest to the inner circumference of the substrate 1020, and the end 1025 on the inner circumference side of the second resin layer 1022 is located nearest to the outer circumference of the substrate 1020. The end 1026 on the inner circumference side of the third resin layer 1023 is in contact with the first resin layer 011. The end 1025 on the inner circumference side of the second resin layer 1022 is covered by the third resin layer 1023. In this constitution, one step is formed by the three resin layers.

FIG. 10(D) shows such a constitution as, in every combination of adjacent resin layers, positions of the ends on the inner circumference side of the resin layers are different from each other, the ends on the inner circumference side of all the resin layers are located at different positions in the radial direction of the substrate, while the end 1035 on the inner circumference side of the second resin layer 1032 is located nearest to the inner circumference of the substrate 1030, and the end 1036 on the inner circumference side of the third resin layer 1033 is located nearest to the outer circumference of the substrate 1030. The end 1034 on the inner circumference side of the first resin layer 1031 is covered by the second resin layer 1032. In this constitution, one step is formed by the three resin layers.

FIG. 10(E) shows such a constitution as, in every combination of adjacent resin layers, positions of the ends on the inner circumference side of the resin layers are different from each other, the ends on the inner circumference side of all the resin layers are located at different positions in the radial direction of the substrate, while the end 1045 on the inner circumference side of the second resin layer 1042 is located nearest to the inner circumference of the substrate 1040, and the end 1044 on the inner circumference side of the first resin layer 1041 is located nearest to the outer circumference of the substrate 1040. The end 1044 on the inner circumference side of the first resin layer 1041 is covered by the second resin layer 1042. In this constitution, one step is formed by the three resin layers.

FIG. 10(F) shows such a constitution as, in every combination of adjacent resin layers, positions of the ends on the inner circumference side of the resin layers are different from each other, the end 1054 on the inner circumference side of the first resin layer 1051 and the end 1056 on the inner circumference side of the third resin layer 1053 are located at the same position in the radial direction of the substrate, while the end 1055 on the inner circumference side of the second resin layer 1052 is located nearest to the inner circumference of the substrate 1050. The end 1054 on the inner circumference side of the first resin layer 1051 is covered by the second resin layer 1052. In this constitution, one step is formed by the three resin layers. Also because the end 1054 on the inner circumference side of the first resin layer and the end 1056 on the inner circumference side of the third resin layer are located at the same position, the first resin layer is likely to be subjected to the load when forming the third resin layer. This constitution is preferable in that peel off of the resin layer is less likely to occur than in the constitution where the ends on the inner circumference side of the three resin layers are aligned.

Figure 11:
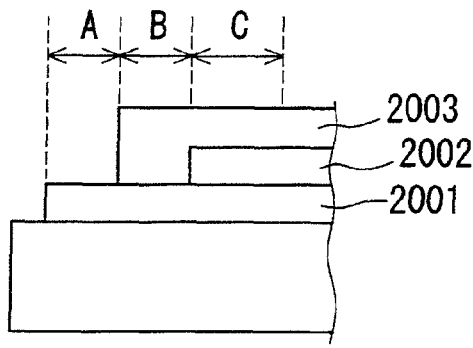
FIG. 11 is a sectional view showing an example of the recording medium of the present invention, with graphs showing the existence of regions in the non-information recording region of the medium, which are exposed to different doses of ultraviolet ray irradiation.
Figure 11:
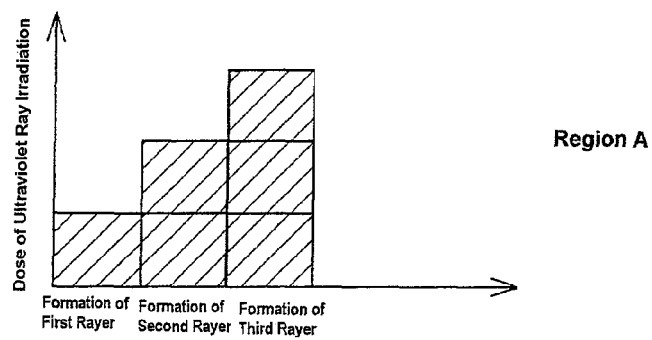
Figure 11:
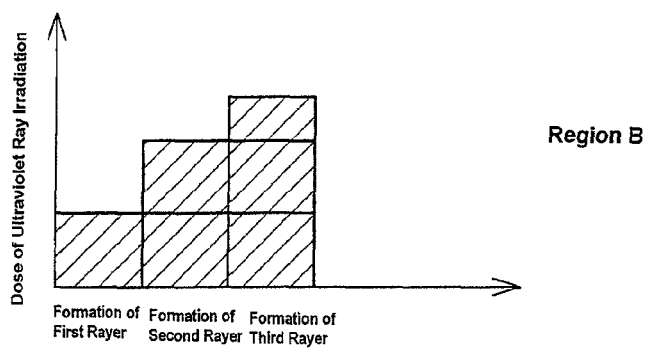
Figure 11:
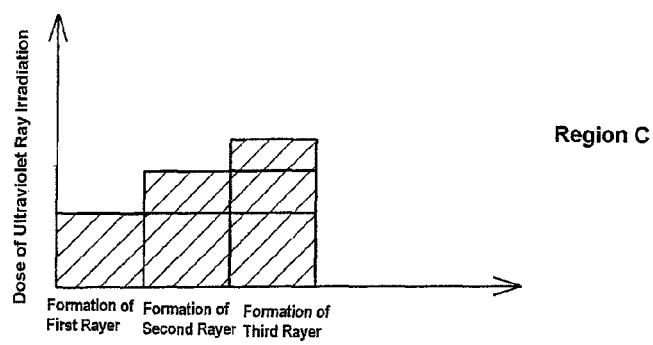

In the drawings, the recording medium of the present invention is schematically shown for the ease of understanding. Actually, the resin layers are not formed in square shape, and may have a profile consisting of curved lines as shown in FIG. 11. In many cases, the resin layers have profiles consisting of curved lines. FIG. 11 corresponds to FIG. 10(A).

The four-layer information recording medium having three resin layers have been described as the first and second embodiments. There is no restriction on the number of resin layers (information recording layers), and the same principle can be applied to a case where four or more resin layers are provided. For example, when four resin layers are provided, the constitution shown in FIG. 10(B) may be applied so that only ends on the inner circumference of the first resin layer and the fourth resin layer make contact with the substrate. Alternatively, the constitution shown in FIG. 10(F) may be applied so that the ends on the inner circumference side of the first and the third resin layers are located at the same position, the ends on the inner circumference side of the second resin and the fourth resin layer are located at the same position, while the fourth resin layer and the second resin layer cover the ends on the inner circumference side of the third resin layer and of the first resin layer, respectively. With such a constitution as the end on the inner circumference side of the resin layers are located at different positions in at least one of the combinations of adjacent resin layers, it is made possible to reduce the defects generated in the process of peeling off the transfer substrate.

As described above, defects generated in the process of peeling off can be reduced greatly, by employing such a constitution as the positions of the ends on the inner circumference side of the resin layers (namely the inner edges of the resin layers) to be formed are different from each other in at least one combination of adjacent resin layers. Additional process or facility is not particularly required, since the position of end on the inner circumference side of the resin layer can be easily set at a desired position by, for example, the screen printing process. As a result, the multi-layer information recording medium of the present invention can be manufactured by an existing facility without modification.

Third Embodiment

A method of dividing the resin layer into areas and differentiating the dose of ultraviolet ray irradiation among the areas when curing the resin layers will now be described as the third embodiment. In a multi-layer disk, transmittance greatly differs between the information recording region where recording layer is formed and the other region (referred to as "non-information recording region"). As a result, the resin layer in the non-information recording region is exposed to much ultraviolet ray every time the resin layer is formed.

Figure 8:
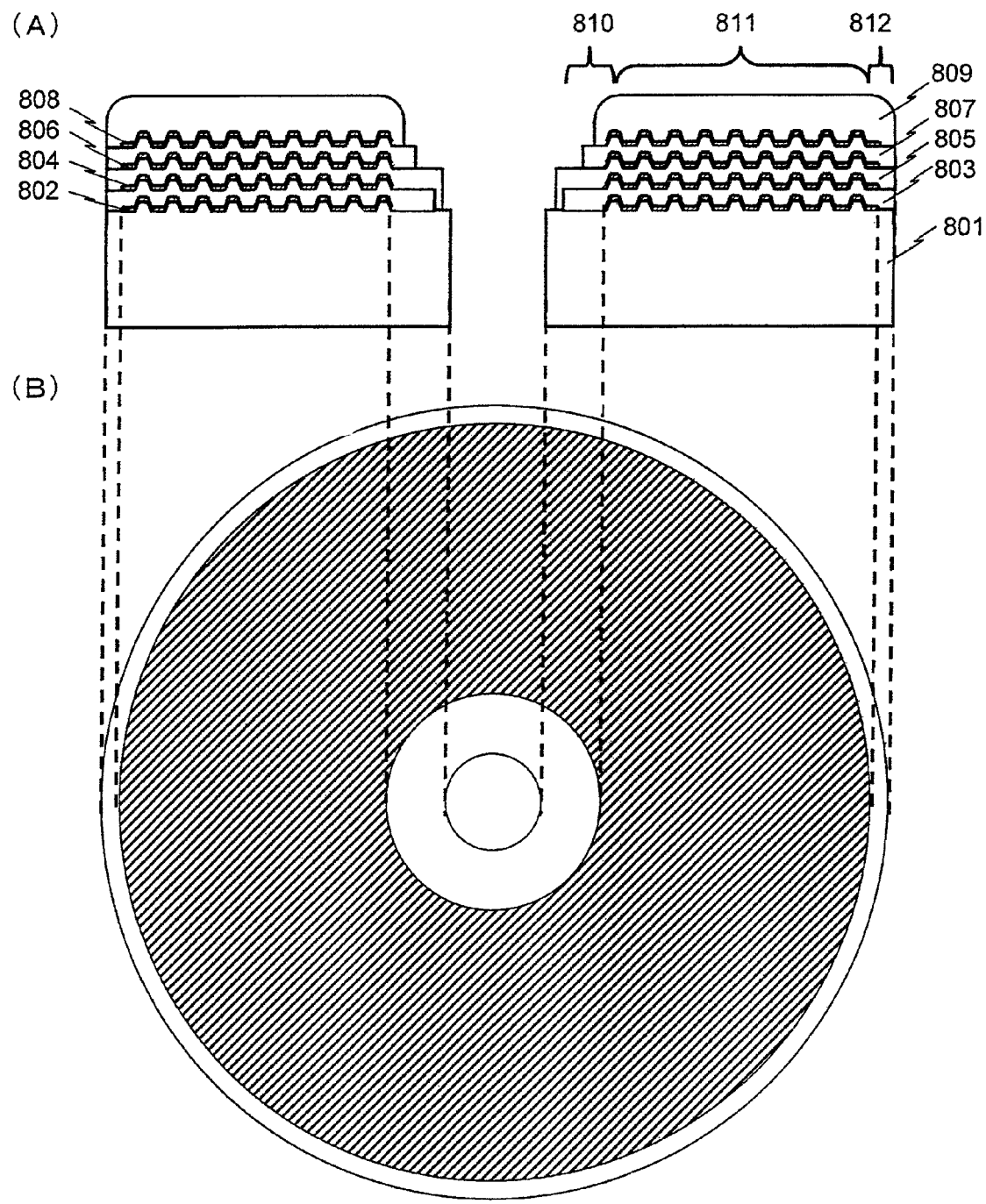
FIG. 8(A) is a sectional view showing an information recording region and non-information recording regions.
FIG. 8(B) is a plan view showing the information recording region and the non-information recording regions.

The non-information recording region, as well as a method for manufacturing the information recording medium by changing the dose of ultraviolet ray irradiation, will be described with reference to FIG. 8. Resin layers 803, 805, 807 of ultraviolet curable resin and a transparent layer (or protective layer) 809 of ultraviolet curable resin are formed on a substrate 801, while a first information recording layer 802, a second information recording layer 804, a third information recording layer 806 and a fourth information recording layer 808 are formed respectively between the respective adjoining resin layers.

The information recording layer is formed from a metal or dielectric material by using a sputtering apparatus. When setting the substrate 801 in the sputtering apparatus, the substrate 801 is normally fastened by means of a fixture, which results in formation of a non-information recording region 810 on the inner circumference where information recording layer is not formed and a non-information recording region 812 on the outer circumference where information recording layer is not formed. These non-information recording regions are formed as a result of fastening the substrate 801 in the sputtering apparatus, and may be referred to as mask region. In these non-information recording regions, the information recording layer is enclosed by the resin layer, so that the information recording layer would not be exposed to the atmosphere and water vapor. Thus the non-information recording region has another function of preventing the information recording layer from deteriorating. The non-information recording region is an annular region defined between a radius of about 21 mm and a radius of about 59 mm and an annular region defined between a radius of about 59 mm and a radius of about 60 mm.

In the process of manufacturing the multi-layer information recording medium, the amount of ultraviolet ray absorbed by the resin varies depending on the region of the resin layer. For example, consider the degree of curing of the resin layer 803 by ultraviolet ray. The dose of ultraviolet ray irradiation used for curing the resin is the same at any region on the resin layer 803. Then the resin layer 803 is irradiated with different level of light depending on the position for curing the resin layer 805 which is formed on the second information layer 804. This is because the second information recording layer 804 serves as a mask so that a region 811 of the resin layer 803 is hardly irradiated with ultraviolet ray, while a region 810 on the inner circumference side and a region 812 on the outer circumference side of the resin layer 803 are irradiated with much ultraviolet ray because the information recording layer is not provided above.

Similarly, absorption of ultraviolet ray irradiation by the resin layer, which ray is applied for forming the resin layer 807 and the transparent layer 809, varies depending on the region. Also because transmittance of the information recording region 811 decreases as more information recording layers are provided, difference in the dose of ultraviolet ray irradiation between the information recording region and the non-information recording region becomes larger in later process of forming the resin layer.

The ultraviolet curable resin has such a property as cross linkage proceeds when irradiated with ultraviolet ray so that the resin in liquid phase is cured. The ultraviolet curable resin also has such a property as the cured one becomes fragile, when irradiated with excessive ultraviolet ray after curing has completed. In case where the peel-off of the transfer substrate is started at the inner circumference, in particular, the fragile resin in the region 810 makes defects more likely to be generated when the transfer substrate is peeled off, thus making the possibility higher for the end on the inner circumference side of the resin layer to peel off from the substrate or to deposit on the transfer substrate.

In order to prevent such inconvenience, it is necessary to adjust the dose of ultraviolet ray irradiation in advance so that the region 810 on the inner circumference side would not be irradiated with excessive ultraviolet ray. When peeling off is started at the outer circumference, dose of ultraviolet ray irradiation may be adjusted so that the region 812 on the outer circumference side would not be irradiated with excessive ultraviolet ray.

Dose of ultraviolet ray irradiation can be adjusted by various methods. For example, when the resin layer is irradiated with ultraviolet ray from the transfer substrate side, dose of ultraviolet ray irradiation received by the non-information recording region can be decreased by decreasing the transmittance of the transfer substrate locally.

Figure 9:
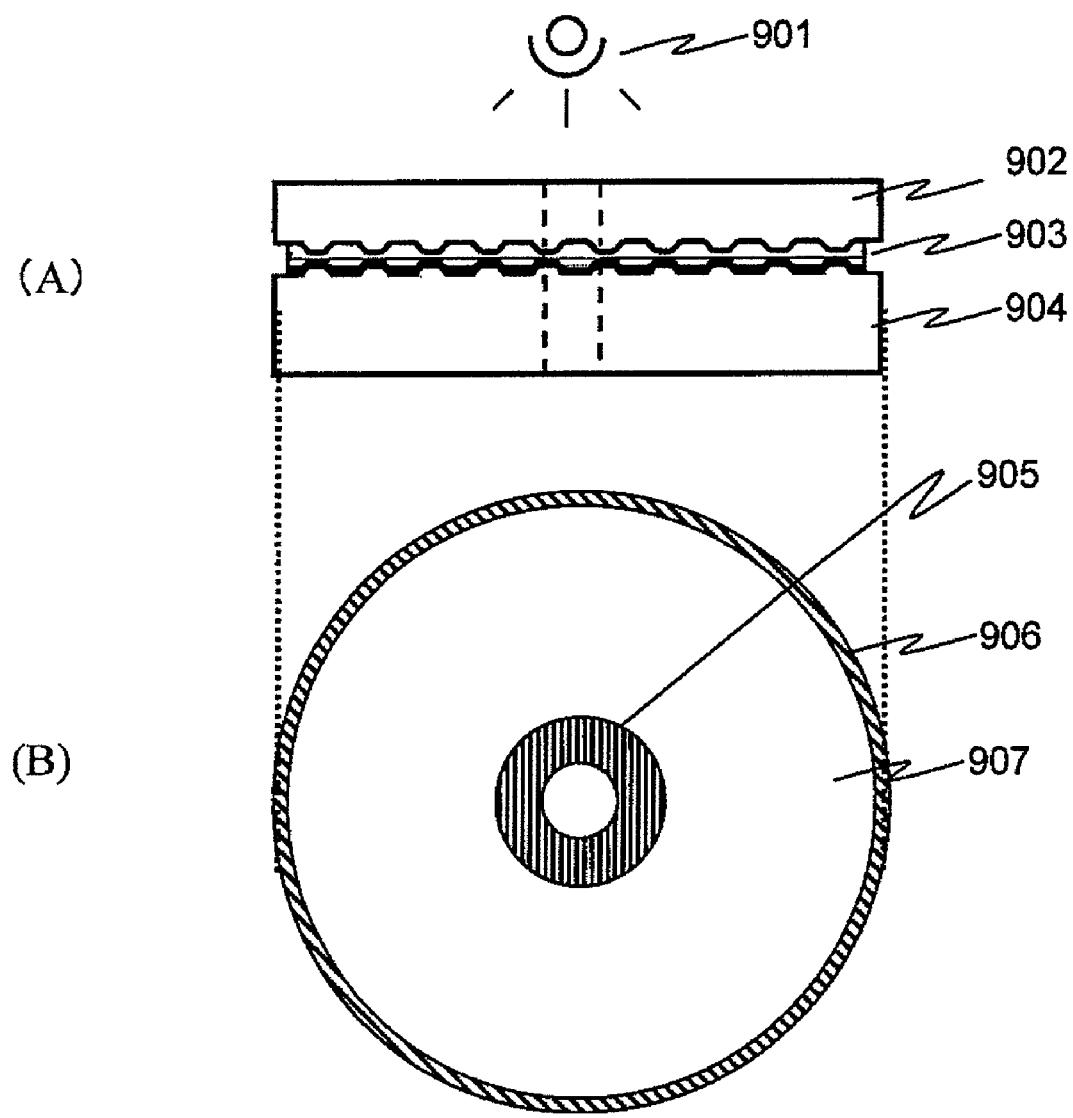
FIG. 9(A) is a schematic diagram showing a process of ultraviolet ray irradiation.
FIG. 9(B) is an overhead view showing the transfer substrate with a mask attached thereto.

FIG. 9 schematically shows the process of irradiating the substrate with ultraviolet ray. In FIG. 9(A), reference numeral 901 denotes an ultraviolet irradiation apparatus, 902 denotes a transfer substrate, 903 denotes a resin layer and 904 denotes a substrate. FIG. 9(B) is a overhead view of the transfer substrate 902 seen from the side of the ultraviolet irradiation apparatus 901. The region 905 on the inner circumference side and the region 907 on the outer circumference side are covered by a metal film in order to decrease the dose of ultraviolet ray irradiation received by the resin layer 903.

There is no restriction on the material of the metal film. For example, the metal film may be formed from Ag, Al, Ni or Cu. In case the resin layer 903 is formed from an acrylic resin, it is preferable to form the metal film such that transmittance thereof to light of wavelength from 280 to 340 nm falls within a range from 10 to 40%. This range of wavelengths depends on the wavelength of the ultraviolet ray that activates the curing initiator that is mixed in the resin layer 903. The transmittance depends on the amount of the curing initiator that is mixed in the resin layer 903. When the resin layer is formed from the resin described above, good releasability can be ensured by irradiating the resin layer 903 with ultraviolet ray having wavelength in the range described above with the transmittance described above. When the transmittance is too high, the resin layer 903 is cured excessively and becomes brittle, thereby causing defects. When the transmittance is too low, the resin layer 903 turns into gel state and is not cured. Therefore, transmittance must be adjusted in accordance to the degree of curing of the resin layer 903.

While the metal film that adjusts the dose of ultraviolet ray irradiation is formed on the transfer substrate in this embodiment, the means for adjusting the dose of ultraviolet ray irradiation is not restricted to metal film. For example, dose of ultraviolet ray irradiation can also be adjusted by inserting an additional member between the ultraviolet irradiation apparatus and the transfer substrate. A member that limits the region irradiated with ultraviolet ray may also be provided on the ultraviolet irradiation apparatus.

Fourth Embodiment

A method for manufacturing the information recording medium of the present invention that involves dividing the regions to be irradiated with ultraviolet ray into smaller areas in the non-information recording region and applying the ultraviolet ray to the areas will now be described as the fourth embodiment. FIG. 11 is a sectional view showing one embodiment of the recording medium of the present invention, with graphs that indicate the existence of regions where different doses of ultraviolet ray are received in the non-information recording region of the medium.

Necessity to divide the non-information recording region into smaller areas will be described with reference to FIG. 11. To form the three resin layers of the constitution shown in FIG. 11, any part of a first resin layer 2001 is irradiated with the same dose of ultraviolet ray. When the ultraviolet curable resin that would become the second resin layer 2002 is applied and is irradiated with ultraviolet ray, the total dose of ultraviolet ray irradiation applied to the region A in the drawing is larger than the total dose of ultraviolet ray irradiation applied to the region B in the drawing since the second resin layer serves as a mask. Then when the ultraviolet curable resin that would become the third resin layer 2003 is applied and is irradiated with ultraviolet ray, the total dose of ultraviolet ray irradiation applied to the region C in the drawing becomes the smallest since the third resin layer as well as the second resin layer serve as the mask. The region A in the drawing is not covered by a mask of resin layer, and is therefore irradiated with ultraviolet ray three times as high as the dose of ultraviolet ray irradiation applied to form the first resin layer.

The doses of ultraviolet ray irradiation applied to different regions are schematically shown in FIG. 11. As shown in the drawing, the regions A, B and C receive significantly different doses of ultraviolet ray irradiation at the stage where the third resin layer has been formed. The graphs shown in FIG. 11 are conceptual ones. The actual dose of ultraviolet ray irradiation received by each region varies depending on the thickness of the second resin layer and the third resin layer, and on the transmittance of the two layers to ultraviolet ray.

When the doses of ultraviolet ray irradiation received by the regions vary as described above, resin of the region A that receives the highest dose of ultraviolet ray irradiation may become brittle and come off, thus resulting in defect of the recording medium. In order to prevent such defects from occurring, it is preferable to mask a portion such as the region A where much dose of ultraviolet ray irradiation is accumulated, so as to decrease the dose of ultraviolet ray irradiation. For example, a mask that has the lowest transmittance is disposed above the region A, and a mask that has a transmittance higher than that of the mask disposed above the region A is disposed above the region B, so that all regions have received the same dose of ultraviolet ray irradiation when the first to third resin layers have been formed. As described above, it is made possible to eliminate a region that is irradiated with excessive ultraviolet ray and thereby form a resin-layer stack that is uniform as a whole by applying the same dose of ultraviolet ray irradiation to all regions.

The mask may be a metal film that is formed on the transfer substrate, as described previously. Alternatively, dose of ultraviolet ray irradiation may be adjusted by inserting an additional member between the ultraviolet irradiation apparatus and the transfer substrate. A member that limits the region irradiated with ultraviolet ray may also be provided on the ultraviolet irradiation apparatus.

INDUSTRIAL APPLICABILITY

The multi-layer information recording medium of the present invention and the method for manufacturing the same make it possible to manufacture, at a higher rate, the multi-layer information recording medium having fewer defects, and are useful as optical disks (such as a digital versatile disk (DVD) and a Blu-ray Disk) that allow precise optical reproduction of large amount of information, and a method of manufacturing the same. The present invention can be applied also to the manufacture of memory having large storage capacity.

What is claimed is:
1. A multi-layer information recording medium comprising a substrate that has an inner circumference and an outer circumference, three or more information recording layers and resin layers disposed between the information recording layers, wherein
    positions of the ends on the inner circumference side of the resin layers are different from each other in at least one combination of two neighboring resin layers; and the end on the inner circumference side of at least one of the resin layers is covered by another resin layer(s).

2. The multi-layer information recording medium according to claim 1, wherein positions of the ends on the inner circumference side are different from each other in each of the combinations of two neighboring resin layers.

3. The multi-layer information recording medium according to claim 1, wherein the position of the end on the inner circumference side of the resin layer located nearest to the substrate is located nearer to the inner circumference of the substrate than the positions of the ends on the inner circumference side of the other resin layers.

4. The multi-layer information recording medium according to claim 1, wherein the ends on the inner circumference side of all the resin layers are in contact with the substrate.

5. The multi-layer information recording medium according to claim 1, wherein the first resin layer through the m-th resin layer are formed in this order on the substrate (m is an integer equal to the number of information recording layers minus 1), and only the end on the inner circumference side of the first resin layer and the end on the inner circumference side of the m-th resin layer make contact with the substrate.

6. The multi-layer information recording medium according to claim 1, wherein the positions of the ends on the inner circumference side of all the resin layers are different from each other.

7. The multi-layer information recording medium according to claim 1, wherein the number of information recording layers is 4 or larger, and the positions of the ends on the inner circumference side of at least two resin layers are the same.

8. The multi-layer information recording medium according to claim 1, wherein the inner circumferential portions are in contact with each other in the combination of the two neighboring resin layers.

9. A method for manufacturing a multi-layer information recording medium that comprises a substrate that has an inner circumference and an outer circumference, three or more information recording layers and resin layers disposed between the information recording layers, wherein a process of forming the resin layers include the steps of:
   (i) applying a radiation-curing resin on the information recording layer to form an uncured resin layer;
   (ii) bonding the transfer substrate that has recesses and bumps on the surface thereof with the uncured resin layer;
   (iii) curing the uncured resin layer; and
   (iv) peeling off the transfer substrate from the surface of the cured resin layer, while
the steps (i) to (iv) are repeated (M−1) times (M is the number of information recording layers);
   in at least one step (i), a region to which the radiation-curing resin is to be applied is selected so as the end on the inner circumference side of the uncured resin layer is different from the end on the inner circumference side of the resin layer that has been formed in the previous process operation, and
   in at least one step (i), a region to which the radiation-curing resin is to be applied is selected so that the end on the inner circumference side of the uncured resin layer covers the end on the inner circumference side of the resin layer that has been formed in the previous process operation.

10. The manufacturing method according to claim 9, wherein the step (i) is carried out by screen printing process or ink jet process.

11. The manufacturing method according to claim 9, wherein the region to which the radiation-curing resin is to be applied is selected so that the end on the inner circumference side thereof makes contact with the substrate, in the step (i).

12. The manufacturing method according to claim 9, wherein a thickness of the transfer substrate is smaller than the thickness of the substrate and the transfer substrate is peeled off from the surface of the resin layer while being warped, in the step (iv) of peeling off the transfer substrate.

13. The manufacturing method according to claim 9, wherein the radiation-curing resin is ultraviolet curable resin and, in the step (iii) of curing the uncured resin layer, the uncured resin layer is cured by being irradiated with ultraviolet ray, and the dose of ultraviolet ray irradiation to the resin layer located in a region on the inner circumference side than a region where the information recording layer is formed (hereinafter referred to as "information recording region") and/or in a region on the outer circumference side than the information recording region is set to be less than the dose of ultraviolet ray irradiation to the resin layer located onto the information recording region.

14. The manufacturing method according to claim 9, wherein the radiation-curing resin is ultraviolet curable resin and the step (iii) of curing the uncured resin layer comprises defining portions which differ in a number of the resin layers stacked therein as different ultraviolet irradiation regions, and the dose of ultraviolet ray irradiation is set smaller for an ultraviolet irradiation region having a smaller number of the resin layers stacked.

* * * * *